(12) United States Patent
Akiyama et al.

(10) Patent No.: US 8,669,957 B2
(45) Date of Patent: Mar. 11, 2014

(54) INFORMATION PROCESSING APPARATUS, INPUT CONTROL METHOD, AND NON-TRANSITORY COMPUTER-READABLE STORAGE MEDIUM

(75) Inventors: Katsuhiko Akiyama, Kawasaki (JP); Koki Hatada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 13/424,998

(22) Filed: Mar. 20, 2012

(65) Prior Publication Data
US 2012/0287062 A1  Nov. 15, 2012

(30) Foreign Application Priority Data

May 10, 2011  (JP) ................. 2011-105509

(51) Int. Cl.
*G06F 3/041* (2006.01)
(52) U.S. Cl.
USPC .......... 345/173; 178/18.03; 382/187; 715/773
(58) Field of Classification Search
USPC ................ 345/173–174; 178/18.01–20.01; 382/186–189; 715/768, 773, 810, 715/812–814, 821, 822, 825, 863
See application file for complete search history.

(56) References Cited

U.S. PATENT DOCUMENTS 5,838,302 A * 11/1998 Kuriyama et al. ............ 345/173
6,088,481 A    7/2000 Okamoto et al.
7,489,307 B2    2/2009 Tanaka et al.
2005/0190973 A1 * 9/2005 Kristensson et al. ......... 382/229
2007/0075978 A1 * 4/2007 Chung .......................... 345/173

FOREIGN PATENT DOCUMENTS

| JP | 8-16313 | 1/1996 |
| JP | 8-137609 | 5/1996 |
| JP | 9-198190 | 7/1997 |
| JP | 9-319502 | 12/1997 |
| JP | 11-126121 | 5/1999 |
| JP | 11-305896 | 11/1999 |
| JP | 2005-92538 | 4/2005 |
| JP | 2005-85242 | 5/2005 |
| JP | 2006-343856 | 12/2006 |
| JP | 2007-213433 | 8/2007 |
| JP | 2008-233483 | 10/2008 |

* cited by examiner

*Primary Examiner* — Hong Zhou
(74) *Attorney, Agent, or Firm* — Fujitsu Patent Center

(57) ABSTRACT

An information processing apparatus accepts an input onto a display screen displayed on a display device. The information processing apparatus determines an input method of a first input using a first time and/or a first trajectory information from a start point to an end point of the accepted first input. The information processing apparatus stores the first trajectory information of the first input in a storage unit for storing therein the trajectory information of an input of which the input method has been determined. The information processing apparatus restores trajectory information of the input that was accepted by accepting, using the first trajectory information stored in the storage unit and trajectory information of a second input if a result of determination with respect to the second input accepted within a predetermined time since the first input is input is different from the input method of the first input.

9 Claims, 5 Drawing Sheets

INFORMATION PROCESSING APPARATUS, INPUT CONTROL METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2011-105509, filed on May 10, 2011, the entire contents of which are incorporated herein by reference.

FIELD

The embodiments discussed herein are directed to an information processing apparatus, an input control method, and an input control program.

BACKGROUND

Conventionally, in a device capable of selectively switching between handwriting input and software keyboard input, a user arbitrarily switches the input method and uses the device. On the other hand, there is known an input device that displays handwriting on a software keyboard in a superimposed manner, and determines whether it is handwriting input or keyboard input, and then automatically switches the input method.

For example, there is an input device that determines either handwriting input or keyboard input depending on whether the start and end points of input handwriting are closed within one key on a software keyboard. Furthermore, there is an input device that determines either handwriting input or keyboard input according to the size of a movement trajectory from touch to release. Moreover, there is an input device that determines either handwriting input or keyboard input depending on whether a touch position is stopped for a certain period of time.

Patent document 1: Japanese Laid-open Patent Publication No. 09-319502
Patent document 2: Japanese Laid-open Patent Publication No. 2005-092538
Patent document 3: Japanese Laid-open Patent Publication No. 2005-085242

However, conventional technologies have a problem that input contrary to user's intention may be implemented due to incorrect determination.

For example, in a conventional technology, whether handwriting input or keyboard input is determined by comparing a movement distance or time from touch to release with a threshold. Therefore, in a case of handwriting a character starting with a small dot in stroke order, if a user unintentionally stops an operation or performs a quick touch operation, an input method different from user's intention may be determined. In this case, input processing is performed by the input method different from that the user intends, and character input contrary to user's intention is performed.

According to one aspect of an information processing apparatus, an input control method, and an input control program discussed herein, it is possible to prevent unintended input.

SUMMARY

According to an aspect of an embodiment of the invention, an information processing apparatus includes an input accepting unit that accepts an input onto a display screen displayed on a display device; a determining unit that determines an input method of a first input using a first time and/or a first trajectory information from a start point to an end point of the first input accepted by the input accepting unit; a storage control unit that stores the first trajectory information of the first input of which the input method is determined by the determining unit in a trajectory-information storage unit for storing therein trajectory information of an input of which the input method is determined; and a restoring unit that restores trajectory information of the input accepted by the input accepting unit using the first trajectory information stored in the trajectory-information storage unit and a second trajectory information of a second input when a result of determination by the determining unit with respect to the second input accepted within a predetermined time since the first input is input is different from the input method of the first input.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings. Incidentally, this invention is not limited to these embodiments.

[a] First Embodiment

In a first embodiment, there are described a functional block diagram of an information processing apparatus discussed herein, a specific example of a process, and a flowchart illustrating the flow of the process, etc. The information processing apparatus discussed herein is an apparatus capable of accepting a user input by automatically switching between handwriting input and software keyboard input, and can be applied to various apparatuses having a pointing device, such as a mobile phone and a smartphone, or the like.

Configuration of Information Processing Apparatus

Figure 1:
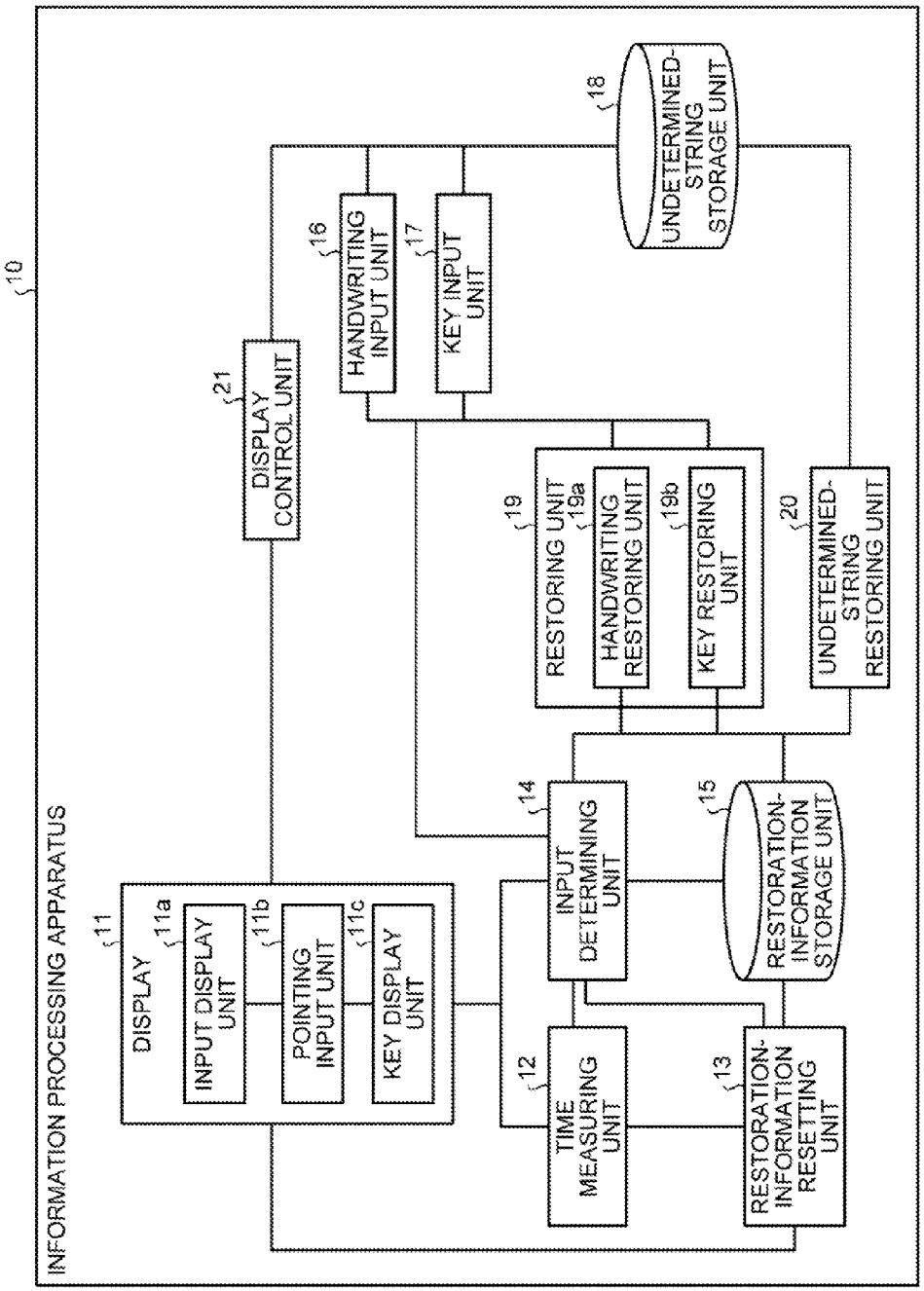
FIG. 1 is a functional block diagram of an information processing apparatus according to a first embodiment.

FIG. 1 is a functional block diagram of an information processing apparatus according to the first embodiment. As illustrated in FIG. 1, an information processing apparatus 10 includes a display 11, a time measuring unit 12, a restoration-information resetting unit 13, an input determining unit 14, and a restoration-information storage unit 15. The information processing apparatus 10 further includes a handwriting input unit 16, a key input unit 17, an undetermined-string storage unit 18, a restoring unit 19, an undetermined-string restoring unit 20, and a display control unit 21.

Each processing unit illustrated in FIG. 1 is implemented by an electronic circuit, such as a central processing unit (CPU), or the like; each storage unit is a semiconductor memory device, hardware, or the like. Incidentally, here, there are explained functions relating to the information processing apparatus discussed herein, and description of functions of various devices to which the information processing apparatus is applied is omitted. For example, in a case where the information processing apparatus illustrated in FIG. 1 is applied to a smartphone or the like, the information processing apparatus shall have functions of the smartphone, such as a call processing function unit, a Web connecting function unit, and a mail processing function unit; however, description of these function units is omitted.

The display 11 is a pointing device, such as a touch panel, that includes an input display unit 11a, a pointing input unit 11b, and a key display unit 11c and accepts an input operation from a user. For example, various types of touch panels, such as an analog resistive type touch panel and a capacitance type touch panel, can be employed as the display 11; user's desired information or instruction is input by the user touching the touch panel. Besides the touch panel, any pointing devices, such as a mouse, a trackball, and object tracking by real-time analysis of camera footage, can be employed in the display 11.

The display 11 displays thereon the pointing input unit 11b and the key display unit 11c in a superimposed manner. Namely, the display 11 displays thereon a screen for accepting a handwriting input and a software keyboard in a superimposed manner.

The input display unit 11a displays thereon a character or a number (hereinafter, sometimes described as "a string" including characters, numbers, or the like) input through the display 11. For example, in the same manner as a general smartphone or the like, if a user input is undetermined, the input display unit 11a displays thereon an undetermined string with an "underline". Furthermore, when input information has been determined, for example, by depression of the "Enter" key, the input display unit 11a displays the determined string without the "underline". Incidentally, modification, etc. of a character is performed in the same manner as general processing, so description of the modification is omitted.

The pointing input unit 11b accepts input of pointing coordinates from the display 11. For example, the pointing input unit 11b acquires coordinates (an X-coordinate and a Y-coordinate) of an operation position at which a user operates the display, and outputs the acquired coordinates to the input determining unit 14 or the like. Furthermore, the pointing input unit 11b continuously acquires the coordinates on the display 11 from touch to release as coordinates where the user starts the operation. This pointing input unit 11b outputs information that input is started or information that the input is ended to the time measuring unit 12.

The coordinates acquired by the pointing input unit 11b correspond to coordinate input during depression of a button in a case of a mouse or a trackball. Furthermore, in a case of object tracking, an action similar to button depression, such as an action of pushing a button if a tracking object has it or an action of thrusting the object forward, triggers the pointing input unit 11b to accept coordinates.

The key display unit 11c displays a software keyboard including a plurality of keys corresponding to a plurality of different alphabets, numbers, symbols, and the like on the display 11. Incidentally, the shape and size of the software keyboard displayed can be arbitrarily set. Therefore, the keys can have not only a square shape but also a special shape such as an elongate shape or a curved elongate shape. Here, there is illustrated an example of the software keyboard in which a plurality of square keys is arranged in the standard QWERTY layout.

The time measuring unit 12 is a processing unit that measures a time between the end of a pointing input and the start of the next pointing input. Then, the time measuring unit 12 determines whether the measured time is beyond a predetermined time; if the measured time is beyond the predetermined time, the time measuring unit 12 outputs a notification of the elapse of the predetermined time to the restoration-information resetting unit 13 or the like.

It is preferable that this predetermined time sufficiently covers a standard value of time interval between strokes when writing a character. The standard value simply includes a mean value. Furthermore, to sufficiently cover the value, for example, there is a method to assume a normal distribution and set the predetermined time within a range of standard deviation. However, on the other hand, it is preferable to set the predetermined time here to a time sufficiently shorter than the standard interval of time to shift from a key input operation to a handwriting input operation. If a value of the predetermined time is too high, there is an increased likelihood of incorrectly determining original key input as handwriting input. In fact, in most cases, the standard time interval between strokes when writing a character is sufficiently shorter than a time to shift the consciousness from key input to handwriting input, and it is preferable to set the predetermined time on the basis of the standard time interval between strokes.

The restoration-information resetting unit 13 is a processing unit that resets restoration information by deleting information stored in the restoration-information storage unit 15 at predetermined timing. For example, the timing for the restoration-information resetting unit 13 to reset includes upon receipt of a notification of the elapse of the predetermined time from the time measuring unit 12, when an undetermined string displayed on the input display unit 11a has been determined, and the like. Incidentally, the other timings will be described later.

The input determining unit 14 is a processing unit that determines an input method of an input using a time or trajectory information from the start point to the end point of input coordinates accepted by the pointing input unit 11b. For example, the input determining unit 14 determines whether it is key input or handwriting input by comparing either or both of the size of a trajectory from the start point to the end point of a pointing input and an input time with respective thresholds. To give an example, if the length of an input trajectory is greater than the threshold, the input determining unit 14 determines that it is handwriting input; on the other hand, if the length of an input trajectory is equal to or less than the threshold, the input determining unit 14 determines that it is key depression.

Incidentally, the determination method explained here is just an example, and well-known other various determination methods can be used. For example, it can be configured that the input determining unit 14 holds a table associating the size of an input trajectory, an input time, and an input method with one another, and determines whether it is key input or handwriting input using the table. An input time is, for example, a time elapsed from the start point of a touch on the display 11 to the end point of the touch; the input determining unit 14 can measure an input time, or the time measuring unit 12 can measure an input time.

Furthermore, when an input B is accepted before the elapse of the predetermined time since an input A of which the input method has been determined to be key input, this input determining unit 14 determines an input method of the input B. Then, we assume that the input determining unit 14 has determined that an input method of the input B is also key input, i.e., an input method of the input B input before the elapse of the predetermined time since the input A matches the input method of the input A.

In this case, the input determining unit 14 stores coordinates of the input B from the start to the end as trajectory information of the input B in association with the input method of the input B, i.e., key input in the restoration-information storage unit 15 in which trajectory information of the input A and the like have been stored. Furthermore, the input determining unit 14 outputs the trajectory information of the input B to an input unit corresponding to the input method of the input B. In the case of the above example, the input determining unit 14 outputs the trajectory information of the input B to the key input unit 17. Namely, the input determining unit 14 sends the trajectory information of the input B to the key input unit 17 to which the input determining unit 14 has already sent the trajectory information of the input A.

As another example, we assume that the input determining unit 14 has determined that an input method of an input B input before the elapse of the predetermined time since an input A of which the input method has been determined to be handwriting input is also handwriting input. In this case, the input determining unit 14 stores trajectory information of the input B in association with the input method of the input B in the restoration-information storage unit 15 in which trajectory information of the input A and the like have been stored. Furthermore, the input determining unit 14 outputs the trajectory information of the input B to the handwriting input unit 16. Namely, the input determining unit 14 sends the trajectory information of the input B to the handwriting input unit 16 to which the input determining unit 14 has already sent the trajectory information of the input A. In other words, the input determining unit 14 sends the continuously-input trajectory information to the handwriting input unit 16.

As still another example, we assume that the input determining unit 14 has determined that an input method of an input B input after the elapse of the predetermined time since an input A of which the input method has been determined to be handwriting input is also handwriting input. In this case, the input determining unit 14 requests the restoration-information resetting unit 13 to delete trajectory information of the input A and the like stored in the restoration-information storage unit 15, and stores trajectory information of the input B in association with the input method of the input B in the restoration-information storage unit 15. Furthermore, the input determining unit 14 outputs the trajectory information of the input B together with information indicating an input operation different from the input A to the handwriting input unit 16. Namely, the input determining unit 14 separates sent trajectory information from trajectory information sent after the input A, and notifies the handwriting input unit 16 that a new handwriting input from the trajectory information of the input B is made. Incidentally, also in a case where the input determining unit 14 has determined that an input method of an input B input after the elapse of the predetermined time since an input A of which the input method has been determined to be key input is also key input, the same process as above can be performed.

On the other hand, we assume that the input determining unit 14 has determined that an input method of an input B is handwriting input while determined that an input method of an input A is key input, i.e., an input method of an input B is different from that of an input A. In this case, the input determining unit 14 stores trajectory information of the input B in association with the input method in the restoration-information storage unit 15. Then, the input determining unit 14 instructs the restoring unit 19 or the undetermined-string restoring unit 20, etc. to restore the trajectory information.

Furthermore, also in a case where an input B is accepted after the elapse of the predetermined time since an input A of which the input method has been determined to be key input, the input determining unit 14 determines an input method of the input B. In this case, the input determining unit 14 outputs an instruction to reset the restoration-information storage unit 15 to the restoration-information resetting unit 13. Then, upon completion of the reset, the input determining unit 14 stores trajectory information of the input B in association with the input method of the input B, i.e., handwriting input in the restoration-information storage unit 15. Furthermore, the input determining unit 14 outputs the trajectory information of the input B to the handwriting input unit 16 corresponding to the input method of the input B.

As described above, when an input B of which the input method is the same method as an input A is input within the predetermined time since the input A was input, the input determining unit 14 determines that input determination with respect to the input A is correct, and stores information of the input B in the restoration-information storage unit 15 so as to follow on information of the input A stored therein. Similarly, when an input B is input after the elapse of the predetermined time since an input A was input, the input determining unit 14 determines that input determination with respect to the input A is correct regardless of an input method of the input B, and stores information of the input B. Furthermore, when an input B of which the input method is different from that of an input A is input within the predetermined time since the input A was input, the input determining unit 14 determines that input determination with respect to the input A is incorrect, and instructs to restore the input.

To return to FIG. 1, the restoration-information storage unit 15 stores therein trajectory information of an input of which the input method has been determined by the input determining unit 14. For example, as for an input A of which the input method has been determined to be key input by the input determining unit 14, the restoration-information storage unit 15 stores therein coordinates of the input A as trajectory information of the input A in association with key input as a result of the input determination. Incidentally, information to be stored in the restoration-information storage unit 15 is stored by the input determining unit 14 or the like, and information stored in the restoration-information storage unit 15 is reset by the restoration-information resetting unit 13 or the like. Furthermore, the restoration-information storage unit 15 can be configured to store therein a result of input determination with respect to only the last input before a currently-accepted input.

Trajectory information stored in the restoration-information storage unit 15 is, for example, a trajectory from the start of a touch accepted by the pointing input unit 11*b* to the end of the touch, i.e., coordinates from coordinates of the start point of an input to coordinates of the end point of the input or coordinate transition, etc. Furthermore, the restoration-information storage unit 15 can further store therein the trajectory size generated by the input determining unit 14 or the like in association with the trajectory information. Moreover, the restoration-information storage unit 15 can separately store trajectory information of a string that has been generated by the handwriting input unit 16 or the key input unit 17 but not yet determined (hereinafter, sometimes described as "an undetermined string") and trajectory information of no string determined in different areas. Namely, the restoration-information storage unit 15 can separately store information to be restored that is used by the restoring unit 19 and information to be restored that is used by the undetermined-string restoring unit 20 by providing management information, such as a flag, to the information to be restored so as to distinguish respective processing statuses of the information.

Furthermore, the restoration-information storage unit 15 has to accumulate a plurality of trajectories of handwriting inputs depending on a subsequent input; on the other hand, as for restoration information of an undetermined string, only one piece of restoration information at the initiation of accumulation from a stage of no restoration information stored is needed, so the restoration-information storage unit 15 does not always have to accumulate every memory. Therefore, it is possible to condition the restoration-information storage unit 15 to "store restoration information of an undetermined string if no restoration information is stored therein".

The handwriting input unit 16 is a processing unit that performs character recognition using trajectory information input by handwriting input and stores a recognized string in the undetermined-string storage unit 18. For example, the handwriting input unit 16 receives at least one piece of trajectory information from the input determining unit 14 or a handwriting restoring unit 19*a*, and performs character recognition on the basis of the received trajectory information. To give an example, when the handwriting input unit 16 has received multiple pieces of trajectory information in succession, the handwriting input unit 16 reproduces the multiple pieces of trajectory information on the coordinate axes and identifies a positional relationship among the multiple pieces of trajectory information. Then, the handwriting input unit 16 identifies an appropriate character by comparing one piece of trajectory information, a combination of the multiple pieces of trajectory information, with a string dictionary or the like stored in an internal memory in advance. Then, the handwriting input unit 16 stores the identified character in the undetermined-string storage unit 18.

Incidentally, when storing the identified character, the handwriting input unit 16 can delete an already-stored undetermined string from the undetermined-string storage unit 18 and then store the identified character in the undetermined-string storage unit 18. Furthermore, in the character recognition performed by the handwriting input unit 16, a character recognition technology widely used in various fields can be employed.

The key input unit 17 is a processing unit that identifies a string pressed by a user using trajectory information input by key input and stores the identified string in the undetermined-string storage unit 18. For example, the key input unit 17 compares coordinates received from the input determining unit 14 or the handwriting restoring unit 19*a* with coordinates of the software keyboard displayed on the key display unit 11*c*, and identifies a string on the keyboard corresponding to the received coordinates. Then, the key input unit 17 stores the identified string in the undetermined-string storage unit 18. Incidentally, when storing the identified string, the key input unit 17 can delete an already-stored undetermined string from the undetermined-string storage unit 18 and then store the identified character in the undetermined-string storage unit 18.

The undetermined-string storage unit 18 stores therein an undetermined string that is a string generated by the handwriting input unit 16 or identified by the key input unit 17 but not yet determined by a user. For example, the undetermined-string storage unit 18 stores therein a string generated by the handwriting input unit 16, such as "う", "漢字", or "ABC". Furthermore, the undetermined-string storage unit 18 stores therein a string identified by the key input unit 17, such as "あ" or "1".

Furthermore, the undetermined-string storage unit 18 stores therein a string that a string deleted by the handwriting input unit 16 or the key input unit 17 to store a new string has been restored by the undetermined-string restoring unit 20. Information to be stored in the undetermined-string storage unit 18 is stored by the handwriting input unit 16, the key input unit 17, the undetermined-string restoring unit 20, or the like, and information stored in the undetermined-string storage unit 18 is deleted by the display control unit 21 or the like.

The restoring unit 19 is a processing unit that includes the handwriting restoring unit 19*a* and a key restoring unit 19*b* and causes the handwriting restoring unit 19*a* or the key restoring unit 19*b* to restore trajectory information accepted by the pointing input unit 11*b* so as to meet user's intention using incorrectly-determined trajectory information stored in the restoration-information storage unit 15 and the like.

The handwriting restoring unit 19*a* is a processing unit that performs restoration by handwriting input upon receipt of a restoration instruction from the input determining unit 14. For example, we assume that in a state where the restoration-information storage unit 15 has stored therein "trajectory information B", "trajectory information C", and "trajectory information D" in reverse chronological order of input time, the handwriting restoring unit 19*a* receives a restoration instruction together with "trajectory information A" from the input determining unit 14. Namely, we assume that in a state where the "trajectory information B", the "trajectory information C", and the "trajectory information D" have been determined to be key inputs, the subsequently-input "trajectory information A" has been determined to be a handwriting input.

In this case, the handwriting restoring unit 19*a* reproduces respective coordinates of the "trajectory information A", the "trajectory information B", the "trajectory information C", and the "trajectory information D" on the coordinate axes, and identifies a positional relationship among the trajectory information. Then, the handwriting restoring unit 19*a* restores trajectory information "from the trajectory information D to the trajectory information A", i.e., an input that a user has intended, and outputs the restored trajectory information to the handwriting input unit 16. Furthermore, the handwriting restoring unit 19*a* deletes the trajectory information used in the restoration from the restoration-information storage unit 15, and notifies the undetermined-string restoring unit 20 of completion of the restoration. Incidentally, the handwriting restoring unit 19*a* can instruct the restoration-information resetting unit 13 to reset the restoration information.

As another example, the handwriting restoring unit 19*a* reproduces respective coordinates of the latest "trajectory information B" and "trajectory information A" on the coordinate axes, and identifies a positional relationship between the trajectory information. Here, if a string can be recognized by a comparison between a dictionary for character recognition and a result of the reproduction, the handwriting restoring unit 19a restores trajectory information "from the trajectory information B to the trajectory information A" and outputs the restored trajectory information to the handwriting input unit 16. Furthermore, the handwriting restoring unit 19a deletes the "trajectory information B" used in the restoration from the restoration-information storage unit 15.

On the other hand, if no string is recognized from a combination of the "trajectory information B" and the "trajectory information A", the handwriting restoring unit 19a performs the same process using the next latest "trajectory information C". In this manner, the handwriting restoring unit 19a can determine whether a string can be recognized by reading out the latest trajectory information sequentially from the restoration-information storage unit 15.

To return to FIG. 1, the key restoring unit 19b is a processing unit that performs restoration by key input upon receipt of a restoration instruction from the input determining unit 14. For example, we assume that in a state where the restoration-information storage unit 15 has stored therein "trajectory information X", "trajectory information Y", and "trajectory information Z" in reverse chronological order of input time, the key restoring unit 19b receives a restoration instruction together with "trajectory information W" from the input determining unit 14. Namely, we assume that in a state where the "trajectory information X", the "trajectory information Y", and the "trajectory information Z" have been determined to be handwriting inputs, the subsequently-input "trajectory information W" has been determined to be a key input.

In this case, the key restoring unit 19b outputs respective coordinates of the "trajectory information X", the "trajectory information Y", the "trajectory information Z", and the "trajectory information W" to the key input unit 17. Furthermore, the key restoring unit 19b deletes trajectory information used in restoration from the restoration-information storage unit 15, and notifies the undetermined-string restoring unit 20 of completion of the restoration. Incidentally, the key restoring unit 19b can instruct the restoration-information resetting unit 13 to reset the restoration information.

The undetermined-string restoring unit 20 is a processing unit that restores input information deleted from the undetermined-string storage unit 18 due to generation of input information, such as a string, by the restoring unit 19 using trajectory information other than trajectory information used for restoration by the restoring unit 19.

For example, we assume that the undetermined-string restoring unit 20 receives a notice of completion of restoration from the handwriting restoring unit 19a, and at this time, "trajectory information B" has been stored in the restoration-information storage unit 15. In this case, the undetermined-string restoring unit 20 determines that the remaining "trajectory information B" is a key input because trajectory information of a handwriting input has been restored by the handwriting restoring unit 19a.

After that, the undetermined-string restoring unit 20 compares coordinates of the "trajectory information B" with coordinates of the software keyboard displayed on the key display unit 11c. Then, the undetermined-string restoring unit 20 restores a "string" on the software keyboard identified by the "trajectory information B" in the undetermined-string storage unit 18. After that, the undetermined-string restoring unit 20 deletes the "trajectory information B" from the restoration-information storage unit 15.

As another example, we assume that the undetermined-string restoring unit 20 receives a notice of completion of restoration from the key restoring unit 19b, and at this time, "trajectory information Z" and "trajectory information Y" have been stored in the restoration-information storage unit 15. In this case, the undetermined-string restoring unit 20 determines that the remaining "trajectory information Z" and "trajectory information Y" are handwriting inputs because trajectory information of a key input has been restored by the key restoring unit 19b.

After that, the undetermined-string restoring unit 20 reproduces respective coordinates of the "trajectory information Z" and the "trajectory information Y" on the coordinate axes, and identifies a positional relationship between the trajectory information. Then, the undetermined-string restoring unit 20 identifies an appropriate character by comparing one piece of trajectory information, a combination of the "trajectory information Z" and the "trajectory information Y", with a string dictionary or the like. Then, the undetermined-string restoring unit 20 restores the identified character in the undetermined-string storage unit 18. After that, the undetermined-string restoring unit 20 deletes the "trajectory information Z" and the "trajectory information Y" from the restoration-information storage unit 15.

The display control unit 21 displays a string stored in the undetermined-string storage unit 18 on the input display unit 11a. For example, the display control unit 21 reads out an undetermined string stored in the undetermined-string storage unit 18, such as "あ", "た", "ま", "+", "痛", and "い", and displays the read string with information indicating that the string is undetermined, such as an underline, on the input display unit 11a. Then, when a determination operation, such as depression of the "Enter" key, has been performed, the display control unit 21 deletes the underline from the string displayed on the input display unit 11a to determine the string. After that, the display control unit 21 deletes the determined string from the undetermined-string storage unit 18. Incidentally, the display control unit 21 also performs character conversion or the like; however, the character conversion is a general technology, so description of the character conversion is omitted.

Specific Example of Process

Subsequently, a specific example of a process to restore trajectory information after detection of incorrect determination is explained with reference to FIGS. 2 to 5. Here, there is described an example where trajectory information determined to be a key input has been determined to be a part of a handwriting input by the next input.

Figure 2:
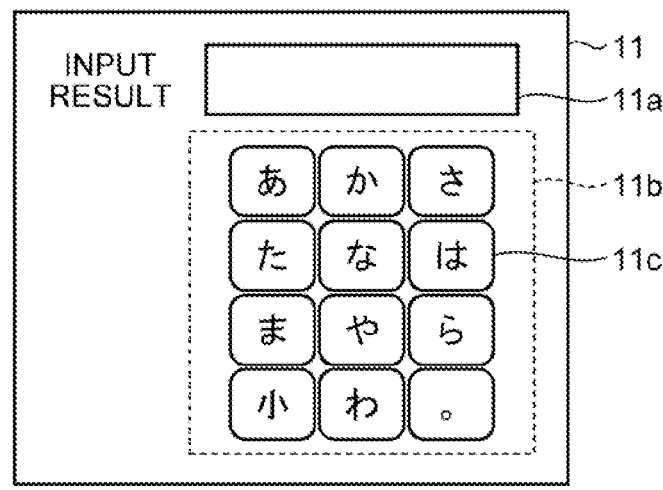
FIG. 2 is a diagram illustrating an example of a screen displayed on a display.
Figure 3:
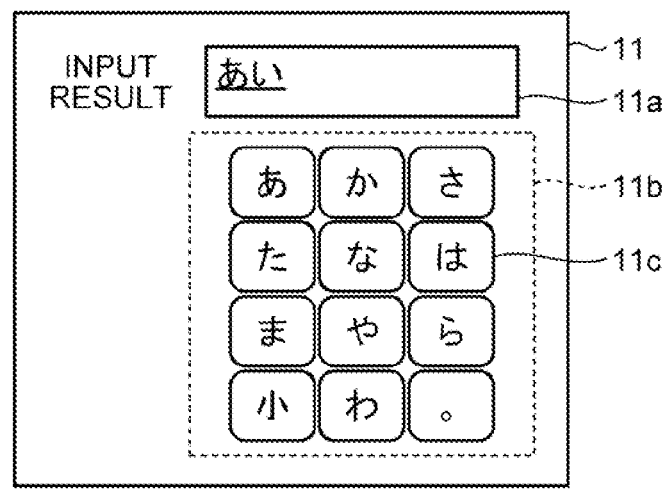
FIG. 3 is a diagram illustrating an example where an undetermined string accepted through a software keyboard is input.
Figure 4:
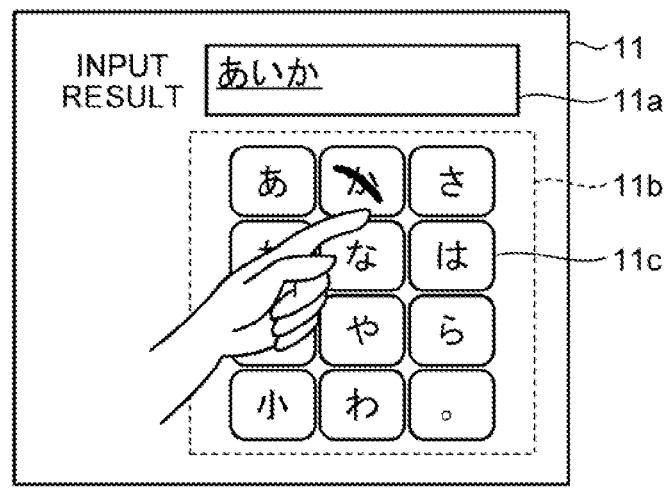
FIG. 4 is a diagram illustrating an example where the first stroke input in a state of FIG. 3 is incorrectly determined.
Figure 5:
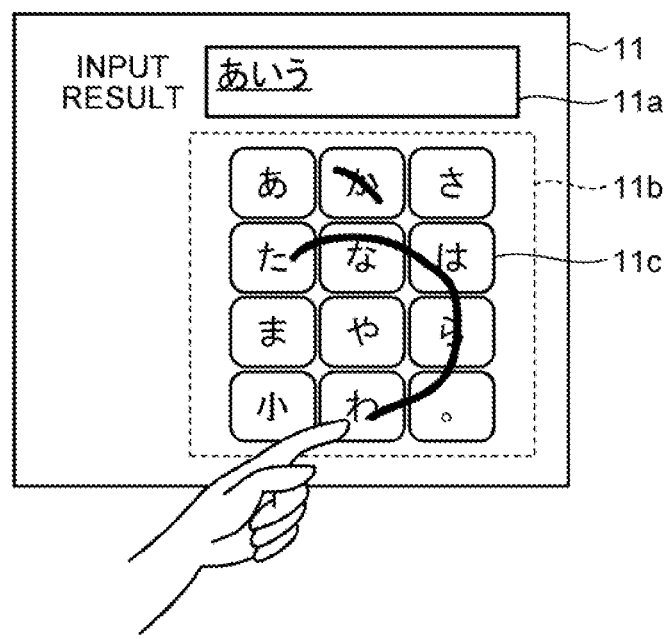
FIG. 5 is a diagram illustrating an example where trajectory information has been restored after the incorrect determination.

FIG. 2 is a diagram illustrating an example of a screen displayed on the display. FIG. 3 is a diagram illustrating an example where an undetermined string accepted through the software keyboard is input. FIG. 4 is a diagram illustrating an example where the first stroke input in a state of FIG. 3 is incorrectly determined. FIG. 5 is a diagram illustrating an example where trajectory information has been restored after the incorrect determination.

As illustrated in FIG. 2, the display 11 of the information processing apparatus 10 displays thereon the input display unit 11a for displaying thereon a user input result, the pointing input unit 11b for accepting a handwriting input, and the software keyboard displayed by the key display unit 11c. Incidentally, the layout of respective display areas is just an example, and can be arbitrarily changed. Incidentally, in this state, no data is stored in the restoration-information storage unit 15 and the undetermined-string storage unit 18 because input processing has just been started.

In the state illustrated in FIG. 2, when the pointing input unit 11b accepts an operation A from a user, the input determining unit 14 determines that an input method of the operation A is key input. Then, the input determining unit 14 stores coordinate information of the operation A and its input method, i.e., key input in the restoration-information storage unit 15. Furthermore, the input determining unit 14 outputs the coordinate information of the operation A to the key input unit 17. The key input unit 17 identifies the input as "あ" by the coordinate information of the operation A, and stores the identified character "あ" in the undetermined-string storage unit 18. After that, the display control unit 21 reads out "あ" from the undetermined-string storage unit 18 and displays "あ" with an "underline" on the input display unit 11*a* as illustrated in FIG. 3.

Next, when the pointing input unit 11*b* accepts an operation B from the user before the elapse of the predetermined time since the input A, the input determining unit 14 determines that an input method of the operation B is key input. Then, the input determining unit 14 stores coordinate information of the operation B and its input method, i.e., key input in the restoration-information storage unit 15 without requesting for restoration because the input method of the input B is the same key input as the previous input A. At this time, the input determining unit 14 can attach a flag indicating tentative determination to the information of the previous input A stored in the restoration-information storage unit 15. Furthermore, the input determining unit 14 outputs the coordinate information of the operation B to the key input unit 17. The key input unit 17 identifies the input as "い" by the coordinate information of the operation B, and stores the identified character "い" in the undetermined-string storage unit 18. After that, the display control unit 21 reads out "い" from the undetermined-string storage unit 18 and displays "い" with an "underline" on the input display unit 11*a* as illustrated in FIG. 3.

Next, when the pointing input unit 11*b* accepts an operation C from the user before the elapse of the predetermined time since the input B, the input determining unit 14 determines that an input method of the operation C is key input. Then, the input determining unit 14 stores coordinate information of the operation C and its input method, i.e., key input in the restoration-information storage unit 15 without requesting for restoration because the input method of the input C is the same key input as the previous input B. At this time, the input determining unit 14 can attach the flag indicating tentative determination to the information of the previous input B stored in the restoration-information storage unit 15. Furthermore, the input determining unit 14 outputs the coordinate information of the operation C to the key input unit 17. The key input unit 17 identifies the input as "痛" by the coordinate information of the operation C, and stores the identified character "痛" in the undetermined-string storage unit 18. After that, the display control unit 21 reads out "痛" from the undetermined-string storage unit 18 and displays "痛" with an "underline" on the input display unit 11*a* as illustrated in FIG. 4.

Next, when the pointing input unit 11*b* accepts an operation D from the user before the elapse of the predetermined time since the input C, the input determining unit 14 determines that an input method of the operation D is handwriting input. In this case, as the input method of the input D is different from that of the previous input C, the input determining unit 14 outputs a request for restoration together with coordinate information of the input D to the handwriting restoring unit 19*a*.

The handwriting restoring unit 19*a* reads out trajectory information of the input C attached with no flag indicating tentative determination from the restoration-information storage unit 15, and restores trajectory information by identifying a positional relationship between the read coordinate information of the input C and the coordinate information of the input D received from the input determining unit 14. Then, the handwriting restoring unit 19*a* outputs the restored trajectory information to the handwriting input unit 16. The handwriting input unit 16 identifies a string "う" by the restored trajectory information. Then, the handwriting input unit 16 deletes "あ", "い", and "痛" stored in the undetermined-string storage unit 18. At this time, the undetermined-string restoring unit 20 reads out respective coordinates of the inputs A and B attached with the flag indicating tentative determination from the restoration-information storage unit 15, and restores the key inputs pressed by the user in the undetermined-string storage unit 18. After that, the handwriting input unit 16 stores the newly-identified character "う" in the undetermined-string storage unit 18. As a result, the display control unit 21 can display a string "あいう" that the character "痛" is deleted from the displayed string "あいか" and the character "う" is newly input as illustrated in FIG. 5.

Furthermore, with the restoration of the trajectory information by handwriting input due to the incorrect determination of the input C, the handwriting restoring unit 19*a* deletes the information stored in the restoration-information storage unit 15. At this time, without completely deleting the information, the handwriting restoring unit 19*a* can attach a delete target flag to the information so as to delete the information when the string is determined. Furthermore, the handwriting restoring unit 19*a* can restore trajectory information using all information stored in the restoration-information storage unit 15 or using the information sequentially from the latest one, and the restoration method can be arbitrarily set.

Flow of Process

Figure 6:
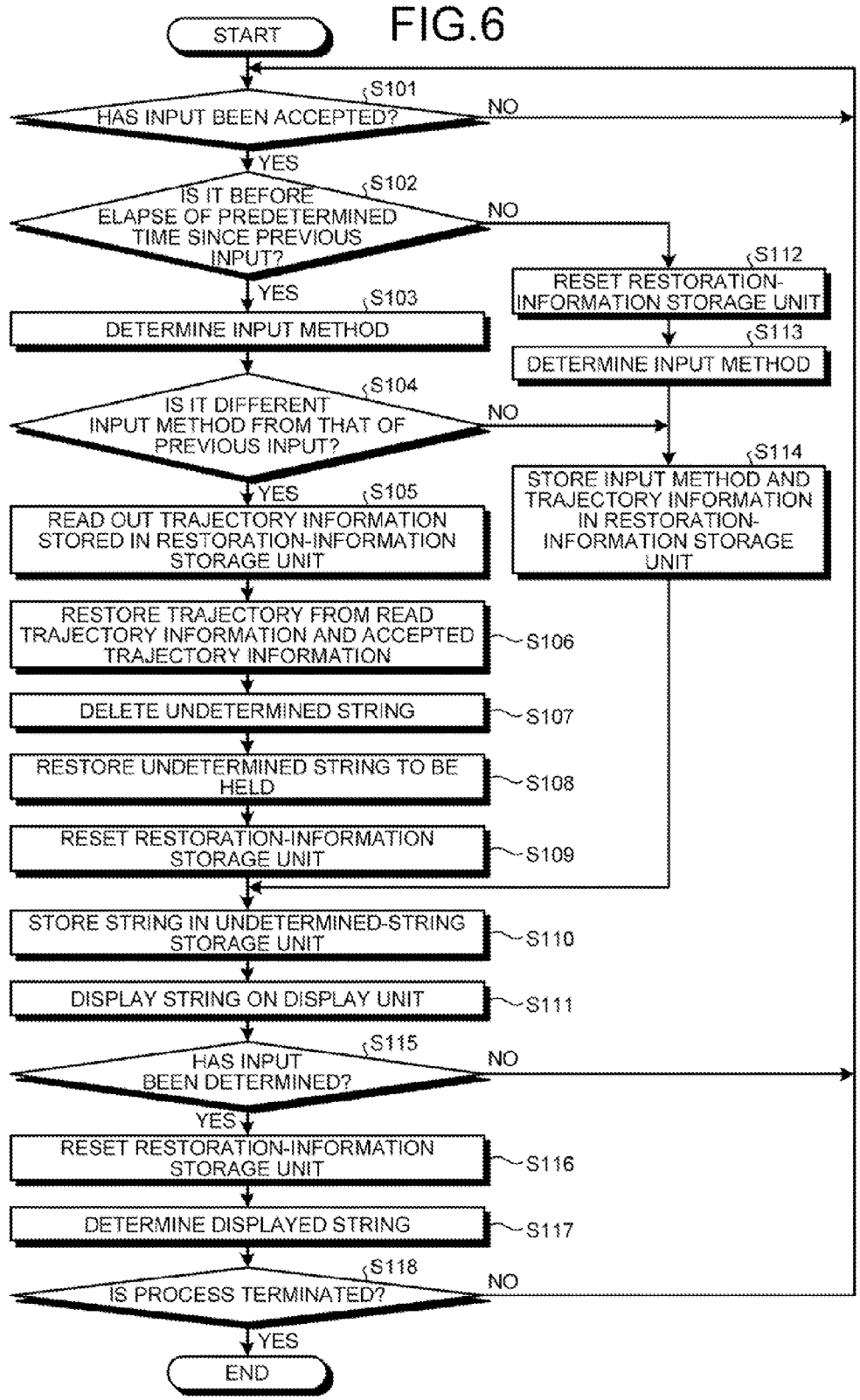
FIG. 6 is a flowchart illustrating the flow of a process performed by the information processing apparatus.

Subsequently, the flow of a process performed by the information processing apparatus is explained. FIG. 6 is a flowchart illustrating the flow of the process performed by the information processing apparatus.

As illustrated in FIG. 6, when the pointing input unit 11*b* of the information processing apparatus 10 accepts an input (YES at Step S101), the input determining unit 14 determines whether the predetermined time has elapsed since the previous input on the basis of a time measured by the time measuring unit 12 (Step S102).

When the currently-accepted input is made before the elapse of the predetermined time since the previous input (YES at Step S102), the input determining unit 14 determines an input method of the currently-accepted input (Step S103). After determined the input method, the input determining unit 14 determines whether the input method of the current input is different from that of the previous input (Step S104).

When the input method is different from that of the previous input (YES at Step S104), a processing unit of the restoring unit 19 corresponding to the input method of the newly-input one reads out trajectory information stored in the restoration-information storage unit 15 (Step S105). Then, the processing unit of the restoring unit 19 restores the incorrectly-determined trajectory information using the read trajectory information and trajectory information of the newly-input input (Step S106).

After that, either the handwriting input unit 16 or the key input unit 17 corresponding to the input method of the newly-input one deletes a string stored in the undetermined-string storage unit 18 (Step S107). The undetermined-string restoring unit 20 restores an undetermined string in the undetermined-string storage unit 18 using trajectory information that has not been used in the restoration out of the deleted string (Step S108).

Then, the processing unit of the restoring unit 19 resets the restoration-information storage unit 15 (Step S109), and the handwriting input unit 16 or the key input unit 17 identifies a string by the trajectory information restored by the restoring unit 19 and stores the identified string in the undetermined-string storage unit 18 (Step S110). Then, the display control unit 21 reads out the string from the undetermined-string storage unit 18, and displays the string in an undetermined manner on the input display unit 11a (Step S111).

On the other hand, at Step S102, when the currently-accepted input is made after the elapse of the predetermined time since the previous input (NO at Step S102), the input determining unit 14 causes the restoration-information resetting unit 13 to reset the restoration-information storage unit 15 (Step S112). Then, the input determining unit 14 determines an input method of the currently-accepted input (Step S113). Then, the input determining unit 14 stores the input method of the currently-accepted input and its trajectory information in the restoration-information storage unit 15 (Step S114).

After that, the handwriting input unit 16 or the key input unit 17 obtains the trajectory information from the input determining unit 14, and identifies a string and stores the identified string in the undetermined-string storage unit 18 (Step S110). Then, the display control unit 21 reads out the string from the undetermined-string storage unit 18, and displays the string in an undetermined manner on the input display unit 11a (Step S111). Furthermore, at Step S104, when it is determined that the input method of the current input is the same method as the previous input (NO at Step S104), the process from Step S114 is performed.

Then, after execution of Step S111, the process from Step S101 is repeated unless the input is determined by a user (NO at Step S115). On the other hand, when the input has been determined by the user (YES at Step S115), the restoration-information resetting unit 13 resets the restoration-information storage unit 15 (Step S116), and the display control unit 21 displays the string in a determined manner on the input display unit 11a (Step S117). After that, the information processing apparatus 10 repeats the process from Step S101 until the user orders the termination of the input control process (Step S118).

Effect of First Embodiment

According to the first embodiment, even if an incorrect key input is entered in the middle of a handwriting input, it is recovered, and a correct handwriting input result is obtained eventually. Likewise, even if an incorrect handwriting input is entered in the middle of a key input, it is recovered, and a correct key input result is obtained eventually. In this manner, even if the information processing apparatus makes an error in determination of a user operation, the information processing apparatus can correct the error and restore the correct input string before the input is determined; therefore, it is possible to prevent input contrary to user's intention.

[b] Second Embodiment

The embodiment of the present invention is described above; besides the above-described embodiment, the present invention can be embodied in various different forms. Other embodiments of the present invention are described below.

Switching of Input Method

In the specific example of the first embodiment, there is described an example where trajectory information incorrectly determined to be a key input is restored to a correct handwriting input; as explained in the functional block diagram, trajectory information incorrectly determined to be a handwriting input can also be restored to a key input. Furthermore, according to the setting of the information processing apparatus 10, the information processing apparatus 10 can be set to detect either one of the above incorrect determinations. Namely, the information processing apparatus 10 can be configured to perform only restoration of a key input to a handwriting input and not to perform restoration of a handwriting input to a key input.

Undetermined String

An undetermined string is, for example, a string before kana-kanji conversion or determination of a predicted input, and is very common in character input to a computer. Such an undetermined string is generally held by software called IME (Input Method Editor); even if an undetermined string is displayed on an app, the string is not yet internally sent to the app. As application to the information processing apparatus, it is conceivable that a program is incorporated in the IME or implemented as a program for appropriately monitoring and controlling the state of the IME.

Reset of Restoration Information

The timing for the restoration-information resetting unit 13 to reset the restoration-information storage unit 15 can be set to various timings other than that is described in the first embodiment. For example, when the input determining unit 14 determines that an input is a handwriting input, the restoration-information resetting unit 13 can delete the memory of the restoration-information storage unit 15 if the number of trajectory information of handwriting input stored in the restoration-information storage unit 15 is a predetermined number or more. This conditional determination and deletion are performed before the processing of the undetermined-string restoring unit 20 and the handwriting restoring unit 19a. The predetermined number here means how many the maximum number of consecutive dots with which a character starts in stroke order is in all input target characters starting with a dot in stroke order. If the number of accumulated strokes is equal to or more than an upper limit number of starting dots plus one, the input is more likely to be not a part of a character but a key input.

Furthermore, the restoration-information resetting unit 13 checks whether a positional relationship among input trajectories accumulated in the restoration-information storage unit 15 meets a predetermined condition; if it meets the condition, the restoration-information resetting unit 13 can delete the memory of the restoration-information storage unit 15. The condition here is for determining whether the accumulated input trajectories appropriate to starting strokes of a character. For example, Japanese characters are written in stroke order from top to bottom and left to right, in general; therefore, it is a rare case that positions of adjacent strokes in stroke order are widely transitioned in a direction from bottom to top or right to left. A Japanese character having "shin'nyou", such as "道", partially fits into the case; however, starting strokes of the character do not fit into the case and include a relatively-large sized stroke. Therefore, in position transition between accumulated adjacent trajectories in stroke order, if there is a wide transition from bottom to top or right to left, it is highly possible that they are not starting strokes of a character, and it is better to clear restoration information.

There is a method to set a threshold of the size of position transition used in this determination on the basis of a character box; for example, the threshold is set to be half the size of the character box. The process discussed herein is based on writing on the software keyboard; a character box can be superimposed on the software keyboard in semi-transparent display so as to lay out the display in a user-friendly manner. Furthermore, the restoration-information resetting unit 13 can be configured to check whether input trajectories stored in the restoration-information storage unit 15 partially match any character form data in a character form dictionary and delete the memory of the restoration-information storage unit 15 if respective similarities with respect to all characters are all below a predetermined value. The publicly-known technology can be used in the partial match between input trajectories and character form data.

The above-described processing conditions of the restoration-information resetting unit 13 are all for deleting restoration information if accumulated input trajectories are unlikely to be a part of a character; these techniques can be arbitrarily combined. In this manner, a trigger to reset the restoration-information storage unit 15 can be arbitrarily determined, and therefore, an appropriate technique can be selected depending on the memory capacity mounted in the information processing apparatus and the like. For example, when the information processing apparatus has large memory, the restoration-information resetting unit 13 does not have to frequently reset the restoration-information storage unit 15, so the restoration-information resetting unit 13 is configured to reset the restoration-information storage unit 15 when a string is determined or restored; on the other hand, when the information processing apparatus has little memory, the restoration-information resetting unit 13 resets the restoration-information storage unit 15 by the method based on the number of pieces of information stored or the like, so that memory pressure can be prevented.

System

Out of the processes described in the present embodiments, all or part of the process described as an automatically-performed one can be manually performed. Furthermore, all or part of the process described as a manually-performed one can be automatically performed by a publicly-known method. In addition, the processing procedures, control procedures, specific names, and information including various data and parameters illustrated in the above description and the drawings can be arbitrarily changed unless otherwise specified.

Furthermore, the components of each apparatus illustrated in the drawings are functionally conceptual ones, and do not always have to be physically configured as illustrated in the drawings. Namely, specific forms of dispersion and integration of the components in the apparatus are not limited to those illustrated in the drawings. In other words, all or part of the components can be configured to be functionally or physically dispersed or integrated in arbitrary units depending on respective loads or use conditions. Moreover, all or any part of processing functions implemented in the apparatus can be realized by a CPU and a program analyzed and executed by the CPU, or can be realized as hardware by wired logic.

Program

Incidentally, the various processes described in the above embodiments can be realized by causing a computer system, such as a personal computer or a workstation, to execute a program prepared in advance. An example of the computer system that executes a program having the same function as those described in the above embodiments is explained below.

Figure 7:
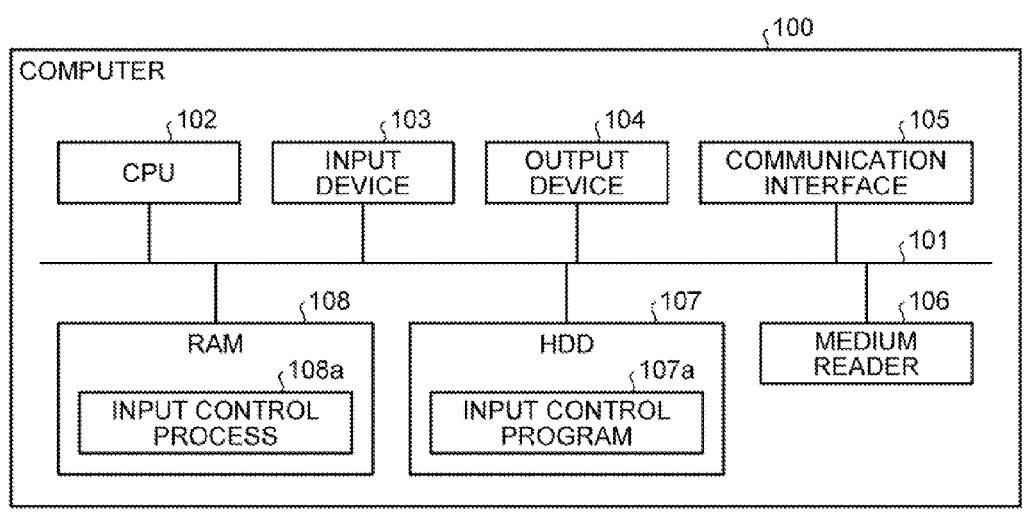
FIG. 7 is a diagram illustrating a hardware configuration example of a computer that executes an input control program.

FIG. 7 is a diagram illustrating a hardware configuration example of a computer that executes an input control program. As illustrated in FIG. 7, a computer 100 includes a CPU 102, an input device 103, an output device 104, a communication interface 105, a medium reader 106, a hard disk drive (HDD) 107, and a random access memory (RAM) 108. The units illustrated in FIG. 7 are connected to one another by a bus 101.

The input device 103 is a mouse and a keyboard; the output device 104 is a display or the like; the communication interface 105 is an interface such as a network interface card (NIC). The HDD 107 stores therein an input control program 107a and information in the storage units illustrated in FIG. 1. The HDD 107 is taken as an example of a recording medium; alternatively, the program can be stored in another computer-readable recording medium, such as a read-only memory (ROM), a RAM, or a CD-ROM, and the computer reads out the program from the recording medium. Incidentally, the recording medium can be placed in a remote location, and the computer accesses the recording medium to acquire and use the program. Furthermore, at that time, the computer can store the acquire program in its own recording medium.

The CPU 102 reads out the input control program 107a from the HDD 107 and expands the read input control program 107a into the RAM 108, thereby operating an input control process 108a that implements the functions described in FIG. 1, etc. Namely, the input control process 108a implements the same functions as the time measuring unit 12, the restoration-information resetting unit 13, and the input determining unit 14 illustrated in FIG. 1. Furthermore, the input control process 108a can perform the same processing as the restoring unit 19, the undetermined-string restoring unit 20, and the display control unit 21 illustrated in FIG. 1. In this manner, the computer 100 reads and executes the program, thereby operating as an information processing apparatus that executes the input control method.

For example, the computer 100 can cause the medium reader 106 to read out the input control program 107a from the recording medium, and execute the read input control program 107a, thereby implementing the same functions as those described in the above embodiments. Incidentally, the program in the present embodiment is not limited to be executed by the computer 100. For example, the present invention can be similarly applied to a case where another computer or a server executes the program and a case where another computer and the server execute the program in cooperation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
an input accepting unit that accepts an input onto a display screen displayed on a display device;
a determining unit that determines an input method of a first input using a first time and/or a first trajectory information from a start point to an end point of the first input accepted by the input accepting unit;

a storage control unit that stores the first trajectory information of the first input of which the input method is determined by the determining unit in a trajectory-information storage unit for storing therein trajectory information of an input of which the input method is determined; and a restoring unit that restores trajectory information of the input accepted by the input accepting unit using the first trajectory information stored in the trajectory-information storage unit and a second trajectory information of a second input when a result of determination by the determining unit with respect to the second input accepted within a predetermined time since the first input is input is different from the input method of the first input.

2. The information processing apparatus according to claim 1, further comprising:

an undetermined-information storage unit that stores therein undetermined input information indicating input information to be displayed on the display device; and an input-information generating unit that generates the undetermined input information using the restored trajectory information and stores the generated undetermined input information in the undetermined-information storage unit.

3. The information processing apparatus according to claim 2, further comprising an undetermined-information restoring unit that generates undetermined input information using trajectory information other than the trajectory information previously used for generation of the undetermined input information by the input-information generating unit and restores the generated undetermined input information in the undetermined-information storage unit.

4. The information processing apparatus according to claim 1, further comprising an information deleting unit that deletes trajectory information stored in the trajectory-information storage unit when trajectory information of the input accepted by the input accepting unit is restored by the restoring unit or when a predetermined time has elapsed since the previous input.

5. The information processing apparatus according to claim 1, further comprising an information deleting unit that identifies a positional relationship between multiple pieces of trajectory information stored in the trajectory-information storage unit, and, when the identified positional relationship meets a certain predetermined condition to determine to be inappropriate to a starting stroke of a character, deletes the trajectory information stored in the trajectory-information storage unit.

6. The information processing apparatus according to claim 1, further comprising an information deleting unit that deletes trajectory information stored in the trajectory-information storage unit when the determining unit determines that an input method of an input accepted by the input accepting unit is a handwriting input and also when the number of pieces of trajectory information, which is determined to be a handwriting input and stored in the trajectory-information storage unit, is a predetermined number or more.

7. An input control method that is executed by a computer, the method comprising:

accepting an input onto a display screen displayed on a display device;

determining an input method of a first input using a first time and/or a first trajectory information from a start point to an end point of the accepted first input;

storing the first trajectory information of the first input of which the input method is determined in a trajectory-information storage unit for storing therein trajectory information of an input of which the input method is determined; and restoring trajectory information of the input that is accepted by accepting, using the first trajectory information stored in the trajectory-information storage unit and a second trajectory information of a second input when a result of determination with respect to the second input accepted within a predetermined time since the first input is input is different from the input method of the first input.

8. A non-transitory computer-readable storage medium having stored therein an input control program causing a computer to execute a process comprising:

accepting an input onto a display screen displayed on a display device;

determining an input method of a first input using a first time and/or a first trajectory information from a start point to an end point of the accepted first input;

storing the first trajectory information of the first input of which the input method is determined in a trajectory-information storage unit for storing therein trajectory information of an input of which the input method is determined; and restoring trajectory information of the input that was accepted by accepting, using the first trajectory information stored in the trajectory-information storage unit and a second trajectory information of a second input when a result of determination with respect to the second input accepted within a predetermined time since the first input is input is different from the input method of the first input.

9. An information processing apparatus comprising:

a memory that stores therein trajectory information of an input; and a processor coupled to the memory, wherein the processor executes a process comprising:

accepting an input onto a display screen displayed on a display device;

determining an input method of a first input using a first time and/or a first trajectory information from a start point to an end point of the accepted first input;

storing the first trajectory information of the first input of which the input method is determined in the memory; and restoring trajectory information of the input that is accepted by accepting, using the first trajectory information stored in the memory and a second trajectory information of a second input when a result of determination with respect to the second input accepted within a predetermined time since the first input is input is different from the input method of the first input.

* * * * *